(12) United States Patent
Takeda et al.

(10) Patent No.: US 7,948,891 B2
(45) Date of Patent: May 24, 2011

(54) WIRELESS COMMUNICATION APPARATUS, COMMUNICATION ROUTING CONTROL APPARATUS, COMMUNICATION ROUTING CONTROL METHOD AND COMMUNICATION SYSTEM

(75) Inventors: Shinji Takeda, Chiyoda-ku (JP); Kengo Yagyu, Chiyoda-ku (JP); Hidenori Aoki, Chiyoda-ku (JP); Yoichi Matsumoto, Chiyoda-ku (JP)

(73) Assignee: NTT DoCoMo, Inc., Tokyo (JP)

( * ) Notice: Subject to any disclaimer, the term of this patent is extended or adjusted under 35 U.S.C. 154(b) by 951 days.

(21) Appl. No.: 11/816,332

(22) PCT Filed: Feb. 15, 2006

(86) PCT No.: PCT/JP2006/302670
§ 371 (c)(1),
(2), (4) Date: Aug. 15, 2007

(87) PCT Pub. No.: WO2006/088066
PCT Pub. Date: Aug. 24, 2006

(65) Prior Publication Data
US 2009/0052374 A1    Feb. 26, 2009

(30) Foreign Application Priority Data

Feb. 16, 2005  (JP) ................. 2005-039173
Mar. 30, 2005  (JP) ................. 2005-098577
Jan. 27, 2006  (JP) ................. 2006-019461

(51) Int. Cl.
*G01R 31/08* (2006.01)
(52) U.S. Cl. ..................... 370/235; 370/338

(58) Field of Classification Search ............... 370/235, 370/238, 252, 254, 310, 338, 389, 392
See application file for complete search history.

(56) References Cited

U.S. PATENT DOCUMENTS

| | | | |
|---|---|---|---|
| 2005/0030921 A1* | 2/2005 | Yau ............................ | 370/329 |
| 2005/0041591 A1* | 2/2005 | Duggi et al. ............... | 370/238 |
| 2005/0073992 A1* | 4/2005 | Lee et al. .................. | 370/351 |
| 2005/0111428 A1* | 5/2005 | Orlik et al. ................ | 370/344 |

FOREIGN PATENT DOCUMENTS

| | | |
|---|---|---|
| JP | 2000 69046 | 3/2000 |
| JP | 2000 78147 | 3/2000 |

(Continued)

OTHER PUBLICATIONS

Pradeep Kyasanur, et al. "Routing in Multi-Channel Multi-Interface Ad Hoc Wireless Networks", Technical Report, Dec. 31, 2004, XP 002587765, 12 pages. URL: http://citeseerx.ist.psu.edu/viewdoc/download?doi=10.1.1.136.7595&rep1&type=pdf.

(Continued)

*Primary Examiner* — Jung Park
(74) *Attorney, Agent, or Firm* — Oblon, Spivak, McClelland, Maier & Neustadt, L.L.P.

(57) ABSTRACT

A wireless communication apparatus for performing communication via a plurality of wireless interfaces in a wireless ad hoc network is disclosed. When the wireless communication apparatus receives a request frame via one of the plurality of wireless interfaces, the wireless communication apparatus sends the request frame from at least two wireless interfaces in the plurality of wireless interfaces. In addition, the wireless communication apparatus selects a wireless interface to be used for communication from among the plurality of wireless interfaces based on the request frame.

13 Claims, 20 Drawing Sheets

FOREIGN PATENT DOCUMENTS

| | | |
|---|---|---|
| JP | 2003 188811 | 7/2003 |
| JP | 2004 153529 | 5/2004 |

OTHER PUBLICATIONS

Ashish Agarwal, et al. "Self-Configuration and Self-Administration of Wireless Grids", MIT Sloan School of Management, Jan. 2004, XP 002587766, 17 pages. URL: http://dspace.mit.edu/bitstream/handle/1721.1/7408/4460-04.pdf?sequence=2.

Ken Ohta, et al., "Ubiquitous Internet Access Via Ad Hoc Network", Information Processing Society of Japan, Chapters 2, 3, pp. 219-224, 2002. (with English abstract).

C. Perkins, et al., "Ad Hoc On-Demand Distance Vector (AODV) Routing", IETF RFC3561, 2003.

David B. Johnson, et al., "The Dynamic Source Routing Protocol for Mobile Ad Hoc Networks (DSR)", Internet Draft, 2003.

IEEE P802.1D/D4, Draft Standard for Local and Metropolitan Area Networks: Media Access Control (MAC) Bridges, pp. 1-263, 2003.

Sung-Ju Lee, et al., "Dynamic Load-Aware Routing in Ad Hoc Networks", ICC 2001, 2001.

Jun-Ichi Hakoda, et al., "Performance Evaluation of Mobile Ad Hoc Routing Protocols Based on Link Expiration Time and Load of Node", vol. J85-B, No. 12, pp. 2108-2118, 2002. (with partial English translation).

Saburo Takahashi, et al., "Metric Selection Mobile Ad Hoc Routing Protocol Based on Link and Node Costs", Technical Report of IEICE, pp. 67-72, 2003. (with English abstract and partial English translation).

Atul Adya, et al., "A Multi-Radio Unification Protocol for IEEE 802.11 Wireless Networks", Technical Report, pp. 1-13, 2003.

* cited by examiner

FIG.1
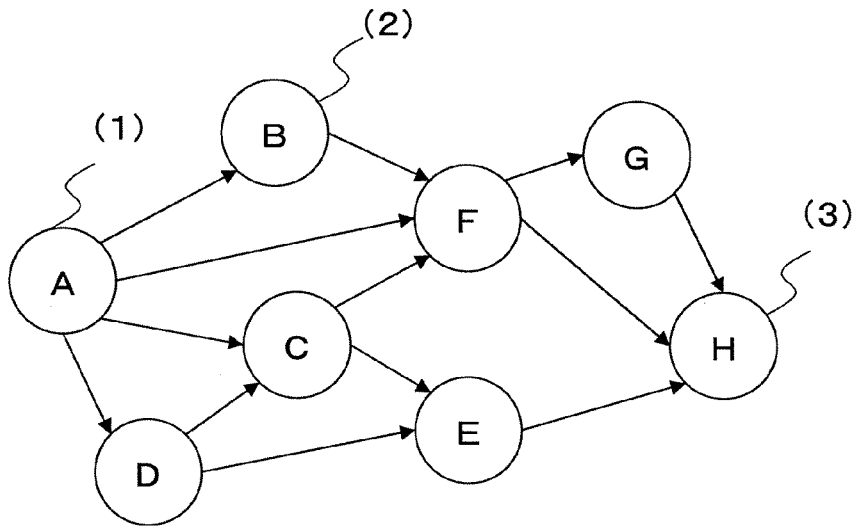
(1) SEND REQUEST FRAME FROM SOURCE NODE A
(2) EXAMINE REQUEST FRAME BY INTERMEDIATE NODES C-G
(3) SELECT SHORTEST HOP ROUTE IN DESTINATION NODE H
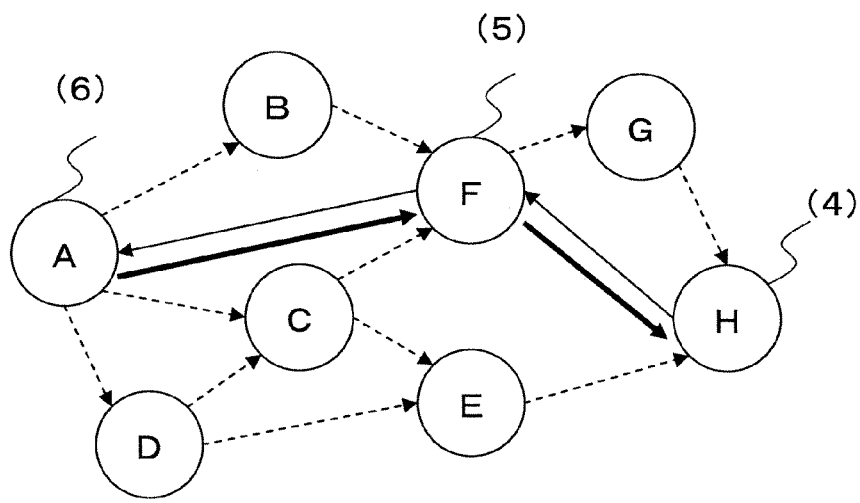
(4) SEND ROUTE ACKNOWLEDGEMENT FRAME FROM DESTINATION NODE H
(5) RELAY ROUTE ACKNOWLEDGEMENT FRAME BY INTERMEDIATE NODE F
(6) DECIDE ROUTE BY SOURCE NODE A

FIG.4

| DESTINATION ADDRESS | NEXT NODE ADDRESS | SENDING INTERFACE | COMMUNICATION COST VALUE | REQUEST ID | SET TIME |
|---|---|---|---|---|---|
| NODE 4 | NODE 4_11a | NODE 2_11a | 12 | 1 | 10:15 |
| NODE 4 | NODE 4_11g | NODE 2_11g | 10 | 2 | 10:20 |

FIG.6

| DESTINATION ADDRESS | NEXT NODE ADDRESS | SENDING INTERFACE | COMMUNICATION COST VALUE | REQUEST ID | SET TIME |
|---|---|---|---|---|---|
| NODE 4 | NODE 4_11a | NODE 2_11a | 12 | 1 | 10:15 |

WHEN DIFFERENCE BETWEEN SENDING
BUFFER AMOUNTS IS SMALL

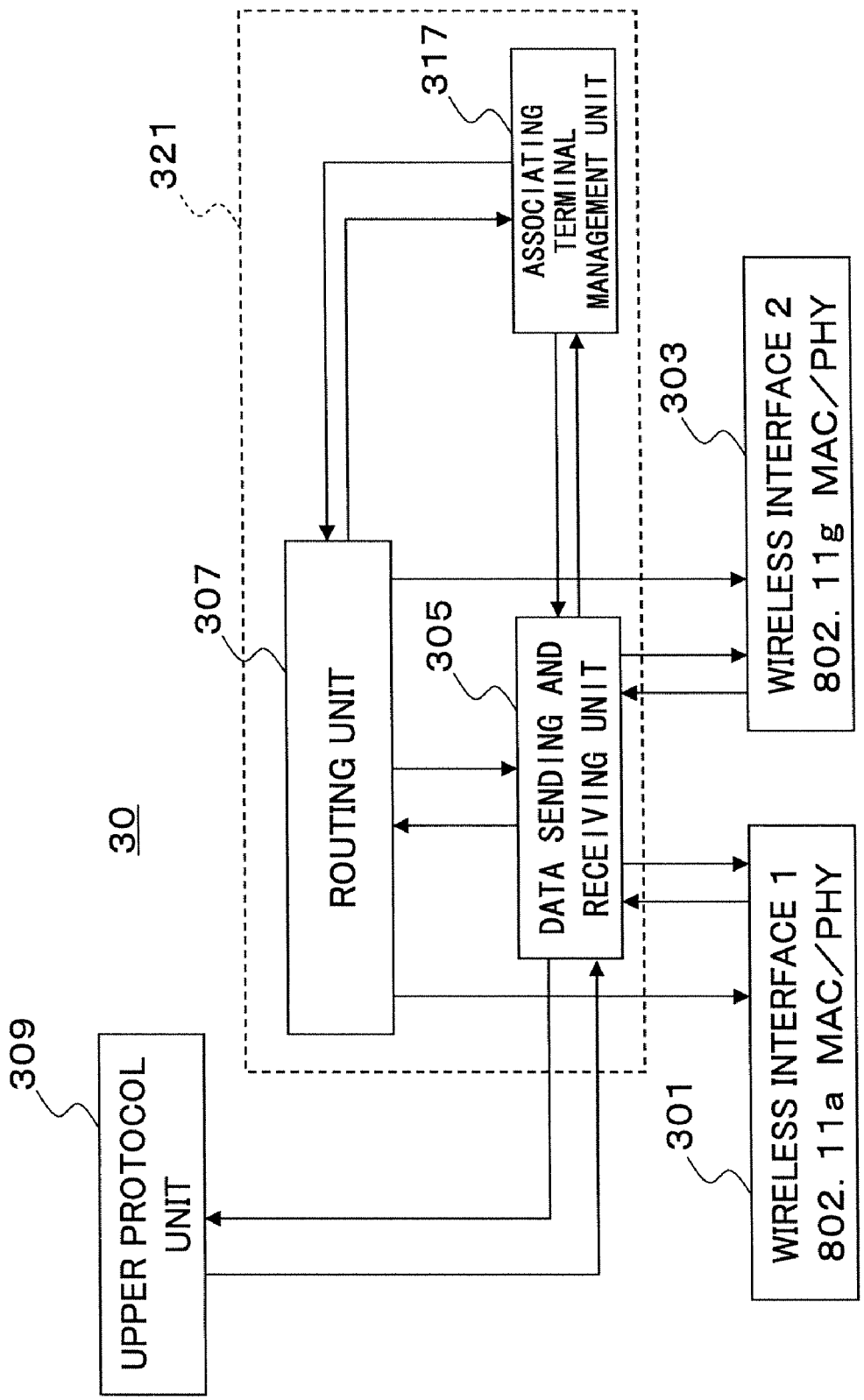

FIG.10

| DESTINATION ADDRESS | SOURCE ADDRESS | NEXT NODE ADDRESS | SENDING INTERFACE | COMMUNICATION COST VALUE | REQUEST ID | SET TIME |
|---|---|---|---|---|---|---|
| NODE 4 | NODE 1 | NODE 4_11a | NODE 2_11a | 12 | 1 | 10:15 |

FIG.12

| DESTINATION ADDRESS | SOURCE ADDRESS | NEXT NODE ADDRESS | SENDING INTERFACE | COMMUNICATION COST VALUE | REQUEST ID | SET TIME |
|---|---|---|---|---|---|---|
| TERMINAL 3 | TERMINAL 1 | NODE 2_11a | NODE 1_11a | 12 | 1 | 10:15 |
| TERMINAL 3 | TERMINAL 1 | NODE 2_11g | NODE 1_11g | 10 | 2 (ROUTE ACKNOWLEDGEMENT) | 10:20 |
| TERMINAL 3 | TERMINAL 1 | NODE 3_11a | NODE 1_11a | 10 | 3 | 10:15 |
| TERMINAL 3 | TERMINAL 1 | NODE 3_11g | NODE 1_11g | 10 | 4 | 10:20 |

FRAME FORMAT FOR ROUTING CONTROL

FIG.16

| Octets:1 | 1 | 1 | 1 | 1 | 4 | 6 | 4 |
|---|---|---|---|---|---|---|---|
| ID | Length | Mode Flags | Dest Count | Hop Count | RREQ ID | Source Address | Source Seq. Num. |

| 6 | 4 | 6 | 4 |
|---|---|---|---|
| Destination Address#1 | Destination Seq. Num. #1 | ..... | ..... |

| 4 | 6 | 4 |
|---|---|---|
| Metric | Destination Address#N | Destination Seq. Num. #N |

FIG.17

| Octets:1 | 1 | 1 | 1 | 6 | 4 |
|---|---|---|---|---|---|
| ID | Length | Mode Flags | Src Count | Destination Address | Destination Seq. Num. |

| 4 | 4 | 6 | 4 | ... | 6 | 4 |
|---|---|---|---|---|---|---|
| Lifetime | Metric | Source Address #1 | Source Seq. Num. #1 | ..... | Source Address #N | Source Seq. Num. #N |

WIRELESS COMMUNICATION APPARATUS, COMMUNICATION ROUTING CONTROL APPARATUS, COMMUNICATION ROUTING CONTROL METHOD AND COMMUNICATION SYSTEM

This application is a 371 of PCT/JP2006/302670 filed on Feb. 15, 2006 and claims priority from Japan applications 2005-039173 filed on Feb. 16, 2005, 2005-098577 filed on Mar. 30, 2005, and 2006-019461 filed on Jan. 27, 2006, the contents of which are hereby incorporated by reference into this application.

TECHNICAL FIELD

The present invention relates to an ad hoc network in which a plurality of wireless communication apparatuses are interconnected by wireless lines to establish a communication route autonomously. More particularly, the present invention relates to a wireless communication apparatus, a communication routing control apparatus, a communication routing control method and a communication system in which the wireless communication apparatus including a plurality of wireless interfaces autonomously switches between its interfaces for effectively utilizing wireless resources.

BACKGROUND ART

The wireless ad hoc network is a technique in which wireless communication apparatuses exchange information on an equal footing without a particular centralized control station to keep communication routes autonomously for forming a network. Routing control in the ad hoc network can be broadly divided into two schemes. One is a distance vector type, and another is a link state type.

In the two schemes, the present invention relates to the distance vector type (non-patent documents 1, 2 and 3) represented by AODV (Ad hoc On-Demand Distance Vector Routing), DSR (Dynamic Source Routing) or STP (Spanning Tree Protocol).

FIG. 1 shows a routing control scheme in a conventional distance vector type algorithm. In the distance vector type algorithm, a source node advertises a request frame, and a destination node sends a route acknowledgement frame as a response signal of the request frame.

An intermediate node that receives request frames stores each distance (communication cost) described in the request frames so as to transfer only a frame describing the smallest communication cost. By repeating this operation, the destination node can ascertain a route by which communication cost from the source node becomes smallest. The destination node that stores an optimal route sends a route acknowledgement frame along the stored route in the reverse order. The passing route of the route acknowledgement frame becomes the optimum route from the source node to the destination node.

In the ad hoc network, terminals autonomously forms a network. Therefore, when traffic concentrates on a particular terminal, communication delay occurs for all terminals that exchange data via the particular terminal.

As a means for solving this problem, in Japanese Laid-Open Patent Application No. 2000-69046 (Patent document 1), it is proposed to apply a concept of the spanning tree used for wired networks to the wireless network. In addition, a mechanism is proposed for avoiding occurrence of relay loop when constructing a spanning tree in a wireless network so as to avoid useless relay as much as possible (refer to patent documents 2 and 3, for example).

In addition, for avoiding effects due to load concentration to a particular node, it is proposed to perform routing control using load of nodes as an index in an ad hoc network (refer to non-patent documents 4 and 5, for example). Other than those, a method is proposed for switching between link cost that is communication available time between nodes and node cost that is busy ratio of nodes (refer to non-patent document 6, for example).

However, in these techniques, each wireless communication apparatus has a single wireless interface. Therefore, when the wireless communication apparatus has a plurality of wireless interfaces, further improvement is required.

On the other hand, when the wireless communication apparatus has a plurality of wireless interfaces, it is proposed to decrease interference so as to use wireless resources efficiently (refer to patent document 7, for example), but concentration of load to a node is not considered.

[Patent document 1] Japanese Laid-Open Patent Application No. 2000-69046
[Patent document 2] Japanese Laid-Open Patent Application No. 2000-78147
[Patent document 3] Japanese Laid-Open Patent Application No. 2003-188811
[Non-Patent document 1] IETF RFC3561: AODV routing
[Non-Patent document 2] Internet Draft: The Dynamic Source Routing Protocol
[Non-Patent document 3] IEEE802.1D std. Spanning Tree Protocol
[Non-Patent document 4] Dynamic Load-Aware Routing in Ad hoc Network, Proc. ICC 2001, June, 2001
[Non-Patent document 5] Performance evaluation for mobile ad hoc routing protocols based on link expiration time and load of node, IEICE TRANSACTIONS, Vol. 85-B, No. 12, 2002
[Non-Patent document 6] Metric selection mobile ad hoc routing protocol based on link and node costs, IEICE Technical Report, NS2003-80, 2003
[Non-Patent document 7] A Multi-Radio Unification Protocol for IEEE802.11 Wireless Networks, Microsoft, 2003

DISCLOSURE OF THE INVENTION

Problem to be Solved by the Invention

As mentioned above, according to the conventional techniques, there is a problem in that it is not realized to avoid load concentration to a node while efficiently using a plurality of wireless interfaces.

The present invention is contrived in view of the above-mentioned circumstances of the conventional techniques, and an object is to effectively utilize wireless resources by performing optimal route selection considering a plurality of wireless interfaces.

Means for Solving the Problem

The above object of the present invention can be achieved by a wireless communication apparatus for performing communication via a plurality of wireless interfaces in a wireless ad hoc network, including:

a data sending and receiving unit for, when receiving a request frame via one of the plurality of wireless interfaces, sending the request frame via at least two wireless interfaces in the plurality of wireless interfaces; and a routing unit for selecting a wireless interface to be used for communication from among the plurality of wireless interfaces based on the request frame.

The routing unit may select the wireless interface to be used for communication from among the plurality of wireless interfaces based on arriving order of the request frame.

According to this wireless apparatus, wireless resources can be effectively utilized by performing optimal route selection considering a plurality of wireless interfaces.

The routing unit may select the wireless interface to be used for communication from among the plurality of wireless interfaces based on arriving order and communication cost of the request frame.

According to this wireless communication apparatus, even for a request frame arriving later, the route can be selected if the communication cost is small. As a result, wireless resources can be effectively utilized by performing optimal route selection considering a plurality of wireless interfaces.

The routing unit may select the wireless interface to be used for communication from among the plurality of wireless interfaces based on communication cost of a received request frame that is received within a predetermined period from arriving time of the request frame.

According to this communication apparatus, delay can be suppressed to be a constant period. Thus, wireless resources can be effectively utilized by performing optimal route selection considering a plurality of wireless interfaces.

The wireless communication apparatus may further include:

a plurality of sending buffers for storing frames for each of the plurality of wireless interfaces; and a measurement unit for measuring a total data amount of frames stored in the sending buffers for each of the plurality of wireless interfaces, wherein, when the data sending and receiving unit receives a request frame with one of the plurality of wireless interfaces, the data sending and receiving unit selects the wireless interface used for sending the request frame based on the total data amount measured by the measurement unit to send the request frame.

According to this wireless communication apparatus, the request frame can be sent from a wireless interface for which data storing amount of the sending buffers is small, so that wireless interface using ratios can be equalized. As a result, wireless resources can be effectively utilized by performing optimal route selection considering a plurality of wireless interfaces.

When the data sending and receiving unit receives the request frame with one of the plurality of wireless interfaces, if difference of the total data amount measurement values among the wireless interfaces measured by the measurement unit is equal to or less than a threshold, the data sending and receiving unit sends the request frame from at least two wireless interfaces in the plurality of wireless interfaces, and if at least one difference of the total data amount measurement values among the wireless interfaces measured by the measurement unit is equal to or greater than a threshold, the data sending and receiving unit sends the request frame from a wireless interface in which the total data amount is smaller.

According to this wireless communication apparatus, the request frame is sent according to the difference of data storing amounts of the sending buffers. According to this selection of transmission of the request frame, evenness of wireless interfaces can be kept in one node, and at the same time, evenness of frequency utilization with surrounding nodes can be kept. As a result, wireless resources can be effectively utilized.

The wireless communication apparatus may function as an access point for managing a terminal under the wireless communication apparatus, and when the data sending and receiving unit receives a frame from the terminal, the data sending and receiving unit sends the request frame on behalf of the terminal.

When the data sending and receiving unit receives a request frame addressed to the terminal under the wireless communication apparatus, the data sending and receiving unit may return a response signal for the request frame on behalf of the terminal.

According to this wireless communication system, even when the terminal does not include an ad hoc routing control function, it becomes possible to keep a route from the source terminal to the destination terminal.

The wireless communication apparatus may further include an associating terminal management unit for managing associating terminal information of terminals under the wireless communication apparatus, wherein, when a new terminal associates with the wireless communication apparatus, the data sending and receiving apparatus broadcasts a frame reporting association of the terminal, and when receiving a frame reporting association of a new terminal from another wireless communication apparatus, the associating terminal management unit deletes association of the terminal from the associating terminal information.

According to this communication apparatus, movement of the terminal can be supported.

In addition, a case in which a wired communication apparatus and the like is connected via an interface other than IEEE 802.11 can be supported.

The routing unit may select the wireless interface from among the plurality of wireless interfaces for each of pairs of a source address and a destination address.

According to this wireless communication apparatus, the wireless interface to be used can be changed for each pair of a source address and a destination address so that effect of load distribution for each wireless interface can be improved. As a result, wireless resources can be effectively utilized by performing optimal route selection considering a plurality of wireless interfaces.

The data sending and receiving unit may periodically send the request frame based on set time that is set in the routing unit.

According to this wireless communication apparatus, the wireless interface can be changed by periodically sending the request frame so that effect of load distribution for each wireless interface can be improved. As a result, wireless resources can be effectively utilized by performing optimal route selection considering a plurality of wireless interfaces.

When the routing unit selects a wireless interface based on the request frame, the routing unit may check whether there is any wireless interface that is previously used for a route to a destination by referring to a routing table, and when there is such a wireless interface, the routing unit weights communication cost for the wireless interface that is previously used so as to select the wireless interface to be used for communication from among the plurality of wireless interfaces based on the weighted communication cost.

According to this wireless communication apparatus, a previously used wireless interface can be easily selected so that changes of communication interfaces can be decreased so that the system can be stabilized. As a result, optimal route selection considering a plurality of wireless interfaces can be realized.

EFFECT OF THE INVENTION

As mentioned before, according to an embodiment of the present invention, wireless resources can be effectively utilized by performing optimal route selection considering a plurality of wireless interfaces.

BRIEF DESCRIPTION OF THE DRAWINGS

FIG. 1 is a diagram showing a routing control scheme in a conventional distance vector type algorithm;

FIG. 4 is a diagram showing an example of a routing table managed in the wireless communication apparatus (node 2) according to the first embodiment of the present invention;

FIG. 6 is a diagram showing information set in the routing table of the wireless communication apparatus (node 2) according to the first embodiment of the present invention;

FIG. 9 is a block diagram of a wireless communication apparatus according to third and fourth embodiments of the present invention;

FIG. 10 is a diagram showing an example of a routing table managed by a wireless communication apparatus according to a fifth embodiment of the present invention;

FIG. 12 is a diagram showing an example of a routing table managed in the wireless communication apparatus (node 1) according to the fifth embodiment of the present invention;

FIG. 16 is a diagram showing a frame format of a payload for routing control of a request frame; and FIG. 17 is a diagram showing a frame format of a payload for routing control of a route check frame.

DESCRIPTION OF REFERENCE SIGNS

Figure 2:
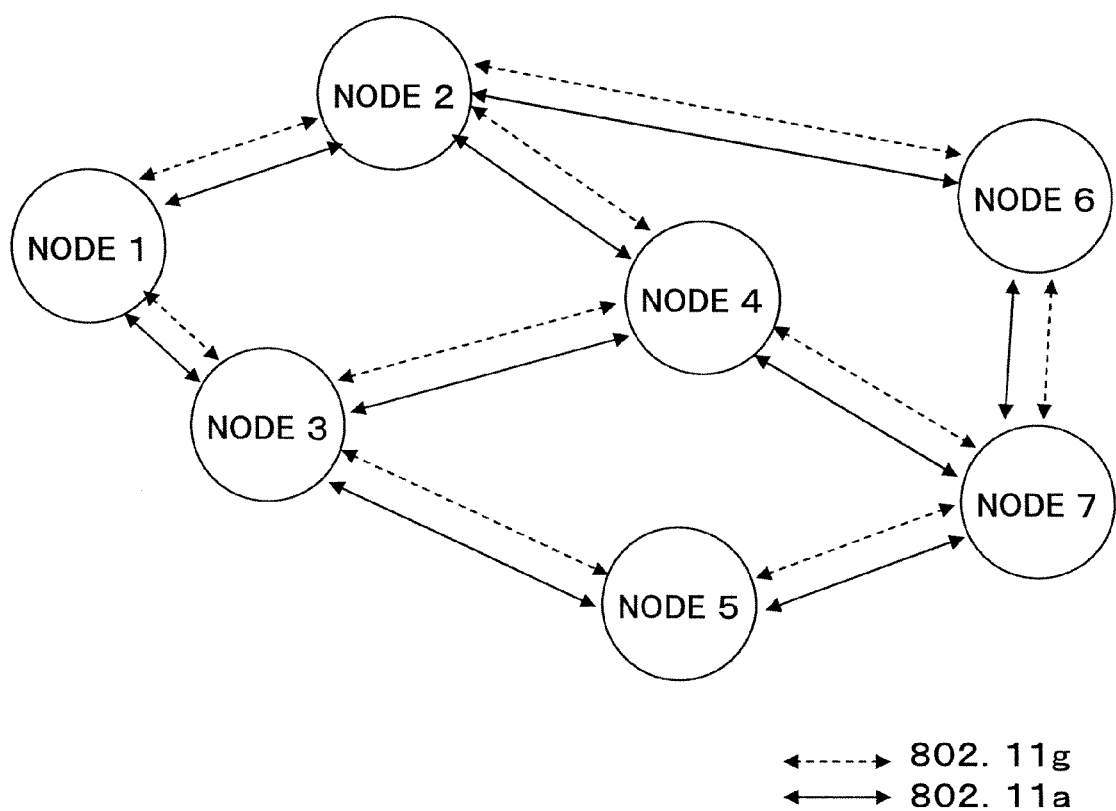
FIG. 2 is a diagram showing a configuration example of wireless communication apparatuses forming a wireless ad hoc network to which the present invention is applied.

10, 20, 30 wireless communication apparatus
101, 201, 301 wireless interface
103, 203, 303 wireless interface
105, 205, 305 data sending and receiving unit
107, 207, 307 routing unit
109, 209, 309 upper protocol unit
121, 221, 321 communication routing control apparatus
211, 213 sending buffer
215 measurement unit
317 associating terminal management unit

PREFERRED EMBODIMENTS FOR CARRYING OUT THE INVENTION

In the following, embodiments of the present invention are described in detail with reference to figures.

Although the media access control (MAC) layer and the physical (PHY) layer for wireless LAN defined by IEEE 802.11 are used as a wireless interface in the following embodiments, other wireless interface may be used. In addition, although two wireless interfaces that are IEEE 802.11a and IEEE 802.11g are used, more than two wireless interfaces may be used.

FIG. 2 is a diagram showing a configuration example of wireless communication apparatuses forming a wireless ad hoc network to which the present invention is applied. Nodes (node 1-node 7) as the wireless communication apparatuses are interconnected via two wireless interfaces (IEEE 802.11a and 802.11g) to form the wireless ad hoc network.

In the example shown in FIG. 2, it is assumed that data is sent from the node 1 to the node 7 via the node 2 and the node 6. For example, when a wireless interface of 802.11a is congested or busy between the node 1 and the node 2, the congestion can be avoided by using a wireless interface of 802.11g. Accordingly, each node uses a wireless interface which is not congested or busy among a plurality of wireless interfaces so as to be able to effectively utilize wireless resources. By the way, the method for avoiding congestion is described later.

Apparatus Configuration of a First Embodiment

Figure 3:
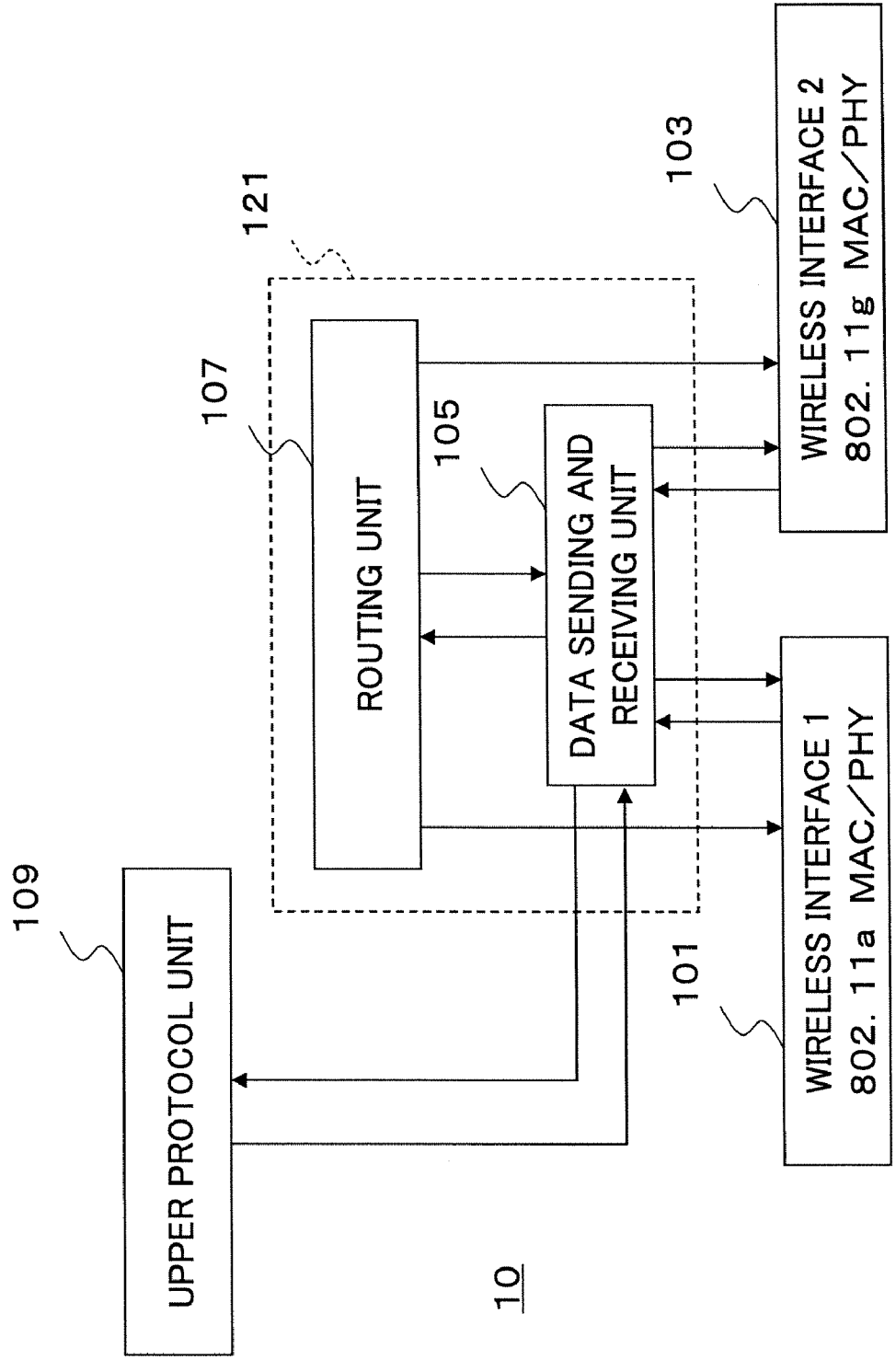
FIG. 3 is a block diagram of a wireless communication apparatus according to a first embodiment of the present invention.

FIG. 3 is a block diagram of a wireless communication apparatus 10 according to the first embodiment of the present invention.

The wireless communication apparatus 10 includes a plurality of wireless interfaces 101 and 103, a data sending and receiving unit 105, a routing unit 107, and an upper protocol unit 109. By the way, the data sending and receiving unit 105 and the routing unit 107 can be configured as a communication routing control apparatus 121. A data frame received from the wireless interface 101, 103 is passed to the data sending and receiving unit 105 and is classified to routing data used for a routing control protocol or user data generated by an upper application. The routing data is passed to the routing unit 107. The data passed to the routing unit 107 is processed according to an after-mentioned routing control method. As a result, a routing table including information of a plurality of wireless interfaces is generated as shown in FIG. 4. By the way, FIG. 4 is a diagram showing an example of a routing table managed by the wireless communications apparatus 10.

As to user data, the destination is ascertained so that data addressed to the own node is passed to the upper protocol unit 111. The data passed to the upper protocol unit 111 is processed by various upper applications. On the other hand, as to data addressed to another node, the destination of the frame is set by referring to the routing table of the routing unit 107 so that the data is sent to a specified wireless interface.

Routing Control Method in the First Embodiment

Figure 5:
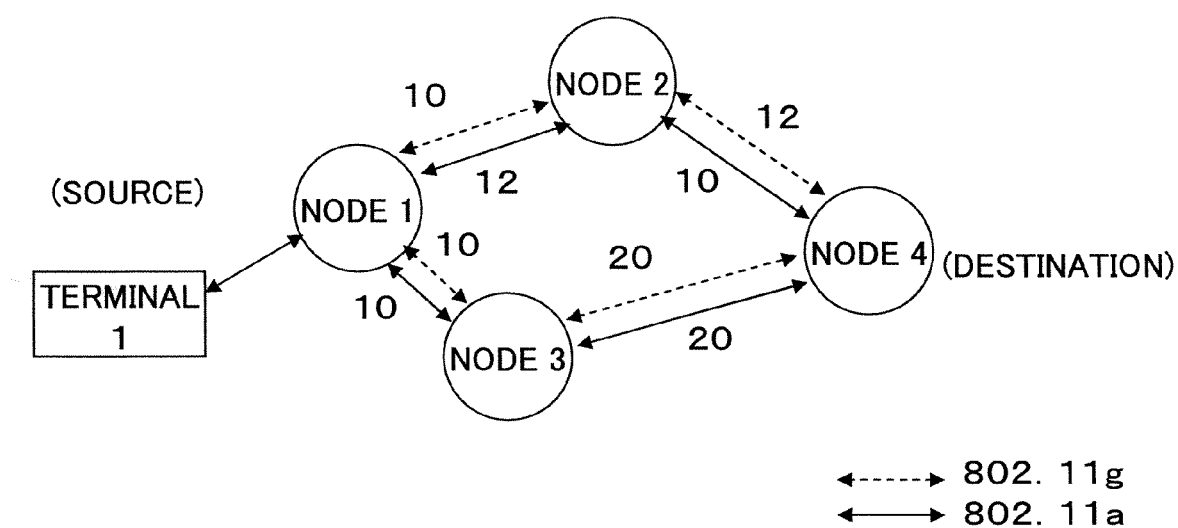
FIG. 5 is a diagram showing a wireless ad hoc network to which the routing control method of the first embodiment of the present invention is applied.

The route control method in the first embodiment of the present invention is described with reference to FIG. 5. In FIG. 5, each of the nodes 1-4 is configured as the wireless communication apparatus 10 shown in FIG. 3. FIG. 5 shows a case where user data from the node 1 (source) to the node 4 (destination) occurs. Each node includes a plurality of wireless interfaces, and calculates communication cost to adjacent nodes for each wireless interface using receive power of frames and the like that are periodically exchanged. Generally, the longer the communication distance is, the larger the communication cost is. For example, communication cost from the node 1 to the node 3 is 10. On the other hand, communication cost from the node 3 to the node 4 is 20. In addition, there may be a case in which communication cost changes even when nodes for communication does not change if wireless environment changes. For example, communication cost for 802.11g from the node 1 to the node 2 is 10. On the other hand, communication cost for 802.11a from the node 1 to the node 2 is 12.

When the node 1 receives user data from a terminal 1, the node 1 checks presence or absence of a route to the node 4 that is the destination by referring to the routing table. When an address of the node 4 is included in destination addresses of the routing table, it can be ascertained that the node 1 holds a route to the node 4. When the node 1 initially communicates with the node 4, the node 1 does not have the route to the node 4 basically.

When the node 1 does not have a route to the destination node, the node 1 broadcasts a request frame addressed to the node 4 to surrounding nodes (node 2 and node 3). By the way, the request frame includes a source address, a destination address, an ID specific to the request frame and a value of communication cost from the source of the request frame. This request frame is sent to both wireless interfaces of 802.11a and 802.11g held by the node 1 via the data sending and receiving unit, and the request frame is transmitted from both of the wireless interfaces.

The node 2 that receives the request frame identifies a request ID to check whether it received the same frame before. When the received request frame is one received first, the node 2 writes values shown in FIG. 6 into the routing table. As a result, the routing table shown in FIG. 4 is configured.

FIG. 6 shows an example of information set into the routing table of the node 2. DESTINATION ADDRESS indicates the node 4 that is a destination of the request frame. By the way, in the case of route acknowledgment frame, the node 1 that is a destination of the route acknowledgment frame is set as the DESTINATION ADDRESS. NEXT NODE ADDRESS indicates the node 4 as an address of a next node and indicates 11a as a wireless interface. SENDING INTERFACE indicates the node 2 as an address of a sending side and indicates 11a as a wireless interface. In addition, a communication cost value and a request ID are set in the routing table. In addition, set time of the routing table is written.

When the node 2 received a frame having the same request ID before, the node 2 adds cost of last one hop to communication cost described in the request frame to calculate communication cost to the node 2. The calculated communication cost to the node 2 is compared with communication cost described in the routing table. As a result of the comparison, when the communication cost to the node 2 is greater than the communication cost in the routing table, the node 2 discards the request frame. On the other hand, when it is smaller, the node 2 rewrites information of the routing table according to information of the received request frame. As a result, information of the routing table shown in FIG. 4 is updated.

For example, when the node 2 receives a request frame, for the first time, in which the communication cost value is 0 via a wireless interface of 802.11a from the node 1, the node 2 adds 12 as cost of last one hop. As a result, communication cost to the node 2 becomes 12, and the value is written into the routing table. After that, when the node 2 receives the same request frame via the wireless interface of 802.11g from the node 1, the node 2 adds 10 as cost of last one hop. As a result, communication cost to the node 2 becomes 10. Since the communication cost is less than the communication cost in the routing table, the node 2 updates information of the routing table. Accordingly, information of a wireless interface of low cost is written into the routing table.

When the node 2 rewrites the routing table, the node 2 checks whether a destination address of the request frame is the own node. In this case, the destination is the node 4. Since an address different from that of the node 2 is set in the request frame, the node 2 needs to retransfer the request frame.

The node 2 updates the value of communication cost in contents of the request frame (adds cost of last one hop and rewrites communication cost to the node 2 with the added value), and sends the request frame from every wireless interface regardless of the wireless interface from which the frame is received.

The node 3 also performs processes similar to those for the node 2. But, as to the node 3, communication cost between the node 3 and the node 1 is the same for both of 802.11g and 802.11a. In this case, when receiving a request frame at later arriving time, the routing table is not updated. As a result, a wireless interface at which the request frame arrives earlier is selected.

The node 4 that receives the request frame from the node 2 or the node 3 performs processes similar to above-mentioned processes. But, since the node 4 is a destination node of the request frame, the node 4 does not retransfer the request frame. Instead of that, the node 4 sends a route acknowledgment frame. The route acknowledgment frame includes a source address, a destination address, and a route acknowledgment ID.

When the node 4 that is the destination node finally receives the request frame, the node 4 checks a route to the request source (node 1) using the routing table. The node 4 sends the route acknowledgement frame to the node 2 (or node 3) following a route and wireless interfaces described in the routing table.

In this case, as shown in FIG. 5, minimum communication cost of the request frame which the node 4 receives via the node 2 is 20 that is a sum of communication cost 10 at the 802.11g from the node 1 to the node 2 and communication cost 10 at the 802.11a from the node 2 to the node 4. On the other hand, minimum communication cost of the request frame which the node 4 receives via the node 3 is 30 that is a sum of communication cost 10 from the node 1 to the node 3 and communication cost 20 from the node 3 to the node 4. Therefore, the node 4 sends the route acknowledgement frame via the node 2.

The node 2 that receives the route acknowledgement frame writes a route to the source of the route acknowledgement frame into the routing table. A route acknowledgement ID is written into a location of REQUEST ID in the routing table shown in FIG. 4. The node 2 that receives the route acknowledgement frame checks whether the destination of the route acknowledgement frame is the own node.

When it is not the own node, the node 2 retransfers the frame according to the routing table.

When the route acknowledgement frame arrives at the node 1 so that the process ends, a communication route between the node 1 and the node 4 is established. Until the communication route is established, a data frame of user data is held in a buffer separately provided in the routing unit. After the communication route is established, the data frame is transferred to a wireless interface used for transmission.

As mentioned before, regardless of a wireless interface by which a request frame is received, the wireless communication apparatus of the first embodiment of the present invention sends a request frame also from other wireless interface. As a result, when the wireless communication apparatus or the wireless interface is congested, the request frame is delayed in the wireless communication apparatus so that delay for receiving the request frame by surrounding nodes occurs. In contrast, a request frame from a wireless communication apparatus or a wireless interface that is not congested can be received earlier than a congested frame. Accordingly, by selecting a source wireless interface of a request frame that arrives earlier as a communication route, avoidance of congestion can be realized. As a result, wireless resources can be effectively utilized by optimal route selection considering a plurality of wireless interfaces.

In addition, the wireless communication apparatus of the first embodiment can select a route of a request frame that arrives later if a value of the communication cost is small. In addition, it is not necessary to select a route by which communication cost is small. When a predetermined period elapses after a request frame arrives, a route having a small communication cost value may be selected from among request frames that arrive during the predetermined period. As a result, wireless resources can be effectively utilized by optimal route selection considering communication cost in addition to the consideration of the plurality of wireless interfaces.

The wireless communication apparatus of the first embodiment may be configured to record arrival time of a request frame that arrives at the destination node first so as to receive only request frames within a threshold time from the arrival time.

As a result, while at the same time limiting delay within a predetermined value, wireless resources can be utilized by optimal route selection considering a plurality of wireless interfaces.

Apparatus Configuration of Second Embodiment

Figure 7:
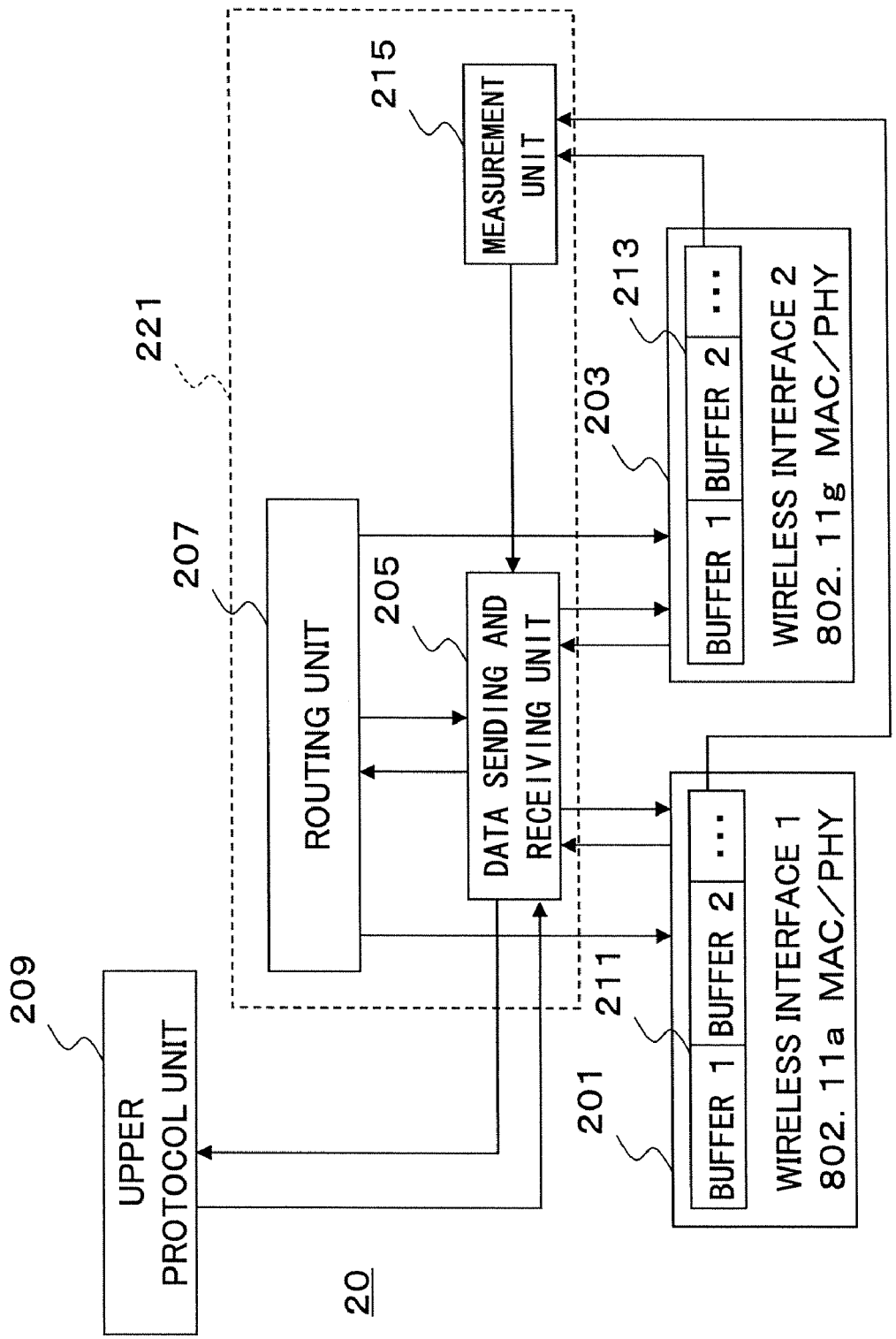
FIG. 7 is a block diagram of a wireless communication apparatus according to a second embodiment of the present invention.

FIG. 7 is a block diagram of a wireless communication apparatus 20 according to a second embodiment of the present invention.

Like the wireless communication apparatus 10 in FIG. 3, the wireless communication apparatus 20 is configured by a plurality of wireless interfaces 201 and 203, a data sending and receiving unit 205, a routing unit 207 and an upper protocol unit 209. The wireless communication apparatus 20 holds a plurality of sending buffers 211, 213 for each wireless interface, and further includes a measurement unit 215 for measuring data amount of frames stored in the sending buffers. By the way, the data sending and receiving unit 205, the routing unit 207 and the measurement unit 215 can be configured as a communication routing control apparatus 221. In this second embodiment, it is assumed that the plurality of sending buffers are selectively used according to quality of service (Qos).

The plurality of sending buffers are defined in IEEE 802.11e, for example. Priority control in 802.11e is realized by an expected value of send waiting time set for each sending buffer.

That is, the higher the priority of a buffer is, the shorter the expected value of waiting time is set to be. Accordingly, transmission is performed quickly with smaller waiting time.

In such a wireless communication apparatus, a frame for routing is sent by using a buffer of relatively high priority since it is necessary to establish a route rapidly. At this time, even though a large amount of data is stored in a buffer of low priority, it does not have a large effect on transmission time of a request frame.

In the present embodiment, the measurement unit 215 measures total data amounts stored in the sending buffers 211, 213 for each wireless interface so that a request frame is sent from a wireless interface corresponding to a smaller total data amount. Accordingly, it becomes possible to determine a wireless interface corresponding to small data amount to be a communication route.

Routing Control Method in the Second Embodiment

Figure 8A:
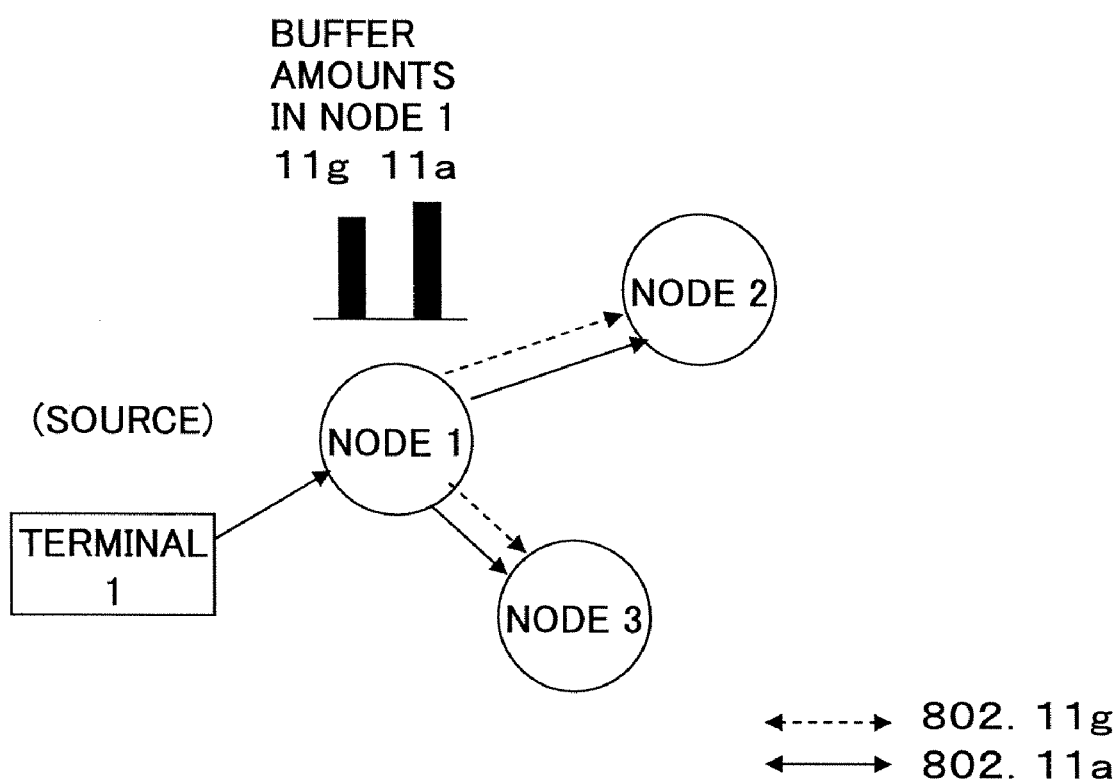
FIG. 8A is a diagram showing a wireless ad hoc network that is configured according to the routing control method of the second embodiment of the present invention (in a case where difference of sending buffer amounts is small)
Figure 8B:
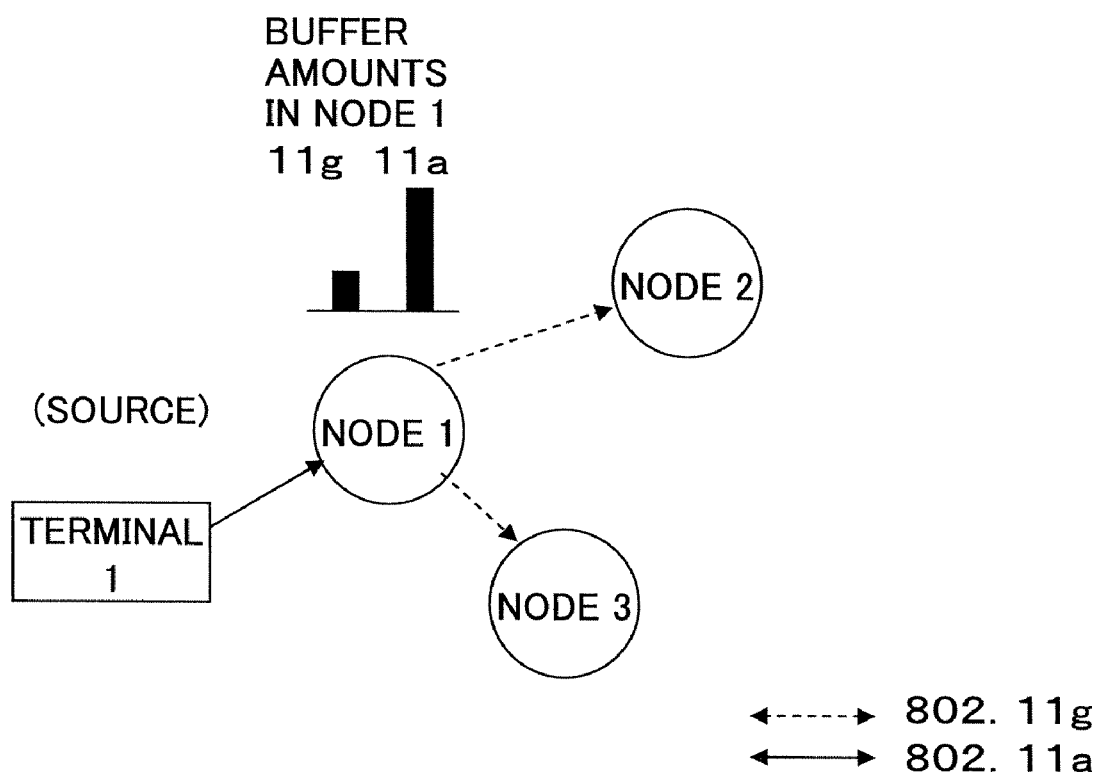
FIG. 8B is a diagram showing a wireless ad hoc network that is configured according to the routing control method of the second embodiment of the present invention (in a case where difference of sending buffer amounts is large)

A routing control method in the second embodiment of the present invention is described with reference to FIGS. 8A and 8B. FIGS. 8A and 8B show cases in which the node 1 configured as the wireless communication apparatus 20 of FIG. 7 sends a request frame to the node 2 and the node 3.

First, each node monitors a total value of data amounts of the sending buffers for each wireless interface in the measurement unit 215. The total value of buffers indicates a total sum of data amounts of sending buffers of a plurality of priorities.

In the case when the node 1 receives user data from the terminal 1 and sends a request frame to a destination node, the node 1 compares monitored total values of the data amounts among wireless interfaces. The node 1 sends a request frame using a wireless interface corresponding to a smaller total value.

As to transmission of the request frame, the request frame may be sent according to a difference between the total values. When the difference between the total values is equal to or less than a predetermined threshold, the request frame is sent from every wireless interface (from 802.11a and 802.11g, for example) according to the routing control method of the first embodiment. When the difference between the total values is greater than a predetermined threshold, the node 1 sends the request frame using only a wireless interface (only 802.11g, for example) corresponding to the smallest total value.

As mentioned before, the wireless communication apparatus of the second embodiment of the present invention sends a request frame from a wireless interface for which the data storing amount of sending buffers is smaller. Accordingly, wireless interface use ratios become even. As a result, wireless resources can be effectively utilized by performing optimal route selection considering a plurality of wireless interfaces.

In addition, the request frame may be sent according to the difference of data storing amounts when measuring the data storing amounts of the sending buffers. That is, when the difference is large, a request frame is sent from a wireless interface for which the data storing amount is smaller. On the other hand, when the difference is small, a request frame is sent from a plurality of wireless interfaces of the wireless communication apparatus. According to the selection of transmission of the request frame, evenness for using frequencies among surrounding nodes can be kept while evenness of wireless interfaces in a node can be kept. As a result, wireless resources can be effectively utilized.

Third Embodiment: In a Case of Access Point that Manages a Terminal that does not Include the Routing Control Function A case where the wireless communication apparatus is an access point that manages a terminal that does not include a routing control function is described in the following as a third embodiment.

In this specification, "access point" means any communication apparatus including a relay function for either a fixed type or a mobile type. "Terminal" means any terminal apparatus that does not include a relay function.

An apparatus configuration of the wireless communication apparatus 30 of the third embodiment is shown in FIG. 9. Like the wireless communication apparatus 10 of FIG. 3, the wireless communication apparatus 30 is configured by a plurality of wireless interfaces 301 and 303, a data sending and receiving unit 305, a routing unit 307 and an upper protocol unit 309. The wireless communication apparatus 30 includes an associating terminal management unit 317 for managing terminal association information of wired communication apparatuses under the wireless communication apparatus 30. By the way, the data sending and receiving unit 305, the routing unit 307 and the measurement unit 317 can be configured as a communication routing control apparatus 321. When a terminal that does not have a routing control function exists in a network, it is necessary that an access point performs routing control on behalf of the terminal. That is, the access point always manages an address of the terminal under the own access point.

In IEEE 802.11, it is defined to manage association information of terminals at all times such that useless frames are not transmitted by wireless. When a terminal under the access point operates according to the definition in IEEE 802.11, the associating terminal management unit 317 manages the associating terminal according to the definition of the IEEE 802.11. The association information of the terminal is exchanged with the routing unit and the routing unit manages the association information of all terminals connected to the wireless interfaces, so that terminals that do not have a route control function can be supported.

More particularly, when receiving a data frame from a terminal under the access point, the access point checks whether the destination exists in the routing table. When the destination does not exist in the routing table, a request frame is sent using the routing control method of the first embodiment or the second embodiment.

The access point that receives a request frame compares information of terminals associating to the own node with the destination address. As a result of the comparison, when the destination corresponds to a terminal under the own node, the access point sends a route acknowledgement frame on behalf of the terminal. When this frame is received by a request source access point, a communication route is established.

As mentioned before, according to the wireless communication apparatus, when an access point receives a frame, from a terminal under the access point, for which a route from the terminal to the destination is unknown, the access point sends a request frame on behalf of the terminal under the access point. On the other hand, the access point that receives a request frame sends a route acknowledgement frame as a response signal for the request frame as a proxy when the terminal of the request destination is under the own node. Accordingly, even when the terminal does not include an ad hoc routing control function, it becomes possible to keep a route from a source terminal to a destination terminal. As a result, even when such a terminal is included in a network, wireless resources can be effectively utilized by optimal route selection considering a plurality of wireless interfaces.

Third Embodiment: In a Case where Terminal Moves

A case is considered in which the wireless communication apparatus is an access point that manages a terminal that does not include a routing control function as mentioned before and the terminal moves between access points.

Since a terminal that does not include a routing control function cannot autonomously establish a communication route, a communication route is disconnected when the terminal moves between access points. Therefore, it is desired to restore the communication route when the terminal moves.

Therefore, when a new terminal is associated with an access point, the access point advertises the terminal information to all over the network. An access point that receives the advertised frame checks whether the advertised address of the terminal is described in associating terminal information managed by the own node using the associating terminal management unit 317. When the address is described in the associating terminal information, since it is ascertained that the terminal moves to another access point, the access point deletes the advertised address of the terminal from the associating terminal information.

The access point that receives the advertised frame refers to the routing table to check whether the advertised address of the terminal exists in the routing table. When it exists in the routing table, it is ascertained that it is necessary to restore the communication route to the advertised terminal. Therefore, the access point reconstructs the communication route by sending a request frame again. Accordingly, it becomes possible to keep disconnected time of the communication route to be short.

As mentioned before, according to the wireless communication apparatus, when a new terminal is associated with an access point, the access point broadcasts a frame reporting the association. On the other hand, when an access point that receives the broadcast frame is an earlier association destination, information of the terminal is discarded from information for managing terminals under the access point. A wireless communication apparatus performing communication with a new terminal or a moved terminal sends a request frame again so that the communication route can be quickly restored. Accordingly, movement of the terminal can be supported. As a result, even when the terminal moves in a network, wireless resources can be effectively utilized by optimal route selection considering a plurality of wireless interfaces.

Fourth Embodiment: In a Case of Access Point Connecting to a Terminal Other than IEEE 802.11

As mentioned before, as to a terminal managed in accordance with the definition of IEEE 802.11, association information of the terminal can be managed according to the definition of IEEE 802.11. However, as to a terminal connected to a wireless interface other than the IEEE 802.11 such as the Ethernet, it is impossible to manage association information of the terminal using the above-mentioned method. That is, an access point connected to a wired communication apparatus cannot manage association of the wired communication apparatus only by connecting to the wired communication apparatus.

Accordingly, a case is described as the fourth embodiment in which the wireless communication apparatus is an access point connected to a terminal that is connected to a wireless interface other than IEEE 802.11 (wired interface in this example).

The wireless communication apparatus of the fourth embodiment includes an apparatus configuration the same as the wireless communication apparatus 30 shown in FIG. 9. Different from the third embodiment, when a wired communication apparatus is connected, the wireless communication apparatus cannot manage the wired communication apparatus only if the associating terminal management unit 317 operates according to the definition of IEEE 802.11.

Therefore, when the access point receives a data frame by a wired interface, the access point adds a source address of the data frame to terminal association information of the associating terminal management unit 317. By adding the address in this way, as to a terminal from which a data frame is sent and is received once by the access point, routing control can be performed in the same way as a terminal managed in accordance with the definition of IEEE 802.11.

As mentioned before, the access point monitors a source address of a data frame from a wired interface, and, when there is a transmission from an unknown wired communication apparatus, the access point records the fact that the wired communication apparatus resides under the access point. By managing the wired communication apparatus under the access point in this way, the access point can send a request frame and a route acknowledgement frame as a proxy. As a result, even when a wired communication apparatus is connected, wireless resources can be effectively utilized by optimal route selection considering a plurality of wireless interfaces.

Fifth Embodiment

A fifth embodiment is described with reference to FIGS. 10-12 in which a source address is added to a routing table of the routing unit. FIG. 10 is a diagram showing an example of a routing table managed by the wireless communication apparatus according to the fifth embodiment of the present invention, and a source address is added to the routing table of FIG. 4.

When receiving a data frame, each wireless communication apparatus not only checks the destination address of the frame header but also checks the source address. When both of them agree with data in the table, data is sent according to the routing table. When one of the destination address and the source address of the frame header is different, route search is performed again by sending a request frame so as to perform route setting in the routing table.

In this specification, "routing table" means route information managed in the routing unit. Since the routing unit sends a frame based on the destination address, the routing table includes at least a destination address. Further, as shown in FIG. 4, the routing table may include a next node address, a sending interface, a communication cost value and a request ID. In addition, the routing table may include a source address like the fifth embodiment, and may include set time like the sixth embodiment. Since the routing table is written based on the request frame, the request frame includes at least a destination address like the routing table. In addition, the request frame may include the source address, the request ID and the communication cost value.

A routing control method in the case where the source address is added to the routing table in this way is described with reference to FIG. 11. FIG. 11 is a diagram showing a wireless ad hoc network configured according to the routing control method in the fifth embodiment of the present invention.

Each of the nodes 1-4 that performs communication via a plurality of wireless interfaces is configured according to the apparatus configuration of the first embodiment, for example, and further, a routing table of the routing unit includes a source address. The nodes 1-4 are interconnected via a plurality of wireless interfaces (802.11a and 802.11g) to form the wireless ad hoc network. Descriptions are provided for sending data from a terminal 1 and a terminal 2 that are connected to the node 1 to a terminal 3 connected to the node 4.

First, when sending data from the terminal 1 to the terminal 3, the node 1 checks whether the node 1 has a route to the destination terminal 3. When performing this checking, the node 1 not only refers to the destination address but also refers to information of the terminal 1 that is the source address to determine presence or absence of the route from the terminal 1 to the terminal 3. When the route does not exist, the node 1 sends a request frame to a plurality of wireless interfaces.

The routing table in the node 1 is configured similarly to the routing control method of the first embodiment, and information shown in FIG. 12 is written into the routing table. FIG. 12 is a diagram showing an example of a routing table managed in the wireless communication apparatus (node 1) according to the fifth embodiment of the present invention. The fifth embodiment is different from the first embodiment in that information of the terminal 1 is written into the routing table as a source address. The node 1 sends data from the terminal 1 to the node 2 with the wireless interface of 802.11g based on the routing table. Further, the node 2 sends the data to the node 4 using a wireless interface of 802.11a so that the data is finally sent to the terminal 3.

Next, when communication from the terminal 2 to the terminal 3 occurs, since the source address is not written into the routing table in a conventional technique, a route is determined according to a routing table to which data was written when communication from the terminal 1 to the terminal 3 occurred. That is, the node 1 performs communication from the terminal 2 to the terminal 3 using the same route as that for communication from the terminal 1 to the terminal 3. According to such a conventional method, there is a possibility that use frequency of wireless interfaces is unbalanced.

Therefore, according to the fifth embodiment, when communication occurs from the terminal 2 to the terminal 3, each node checks a source address, and sends a request frame when a pair of a source address and a destination address does not agree.

Figure 11:
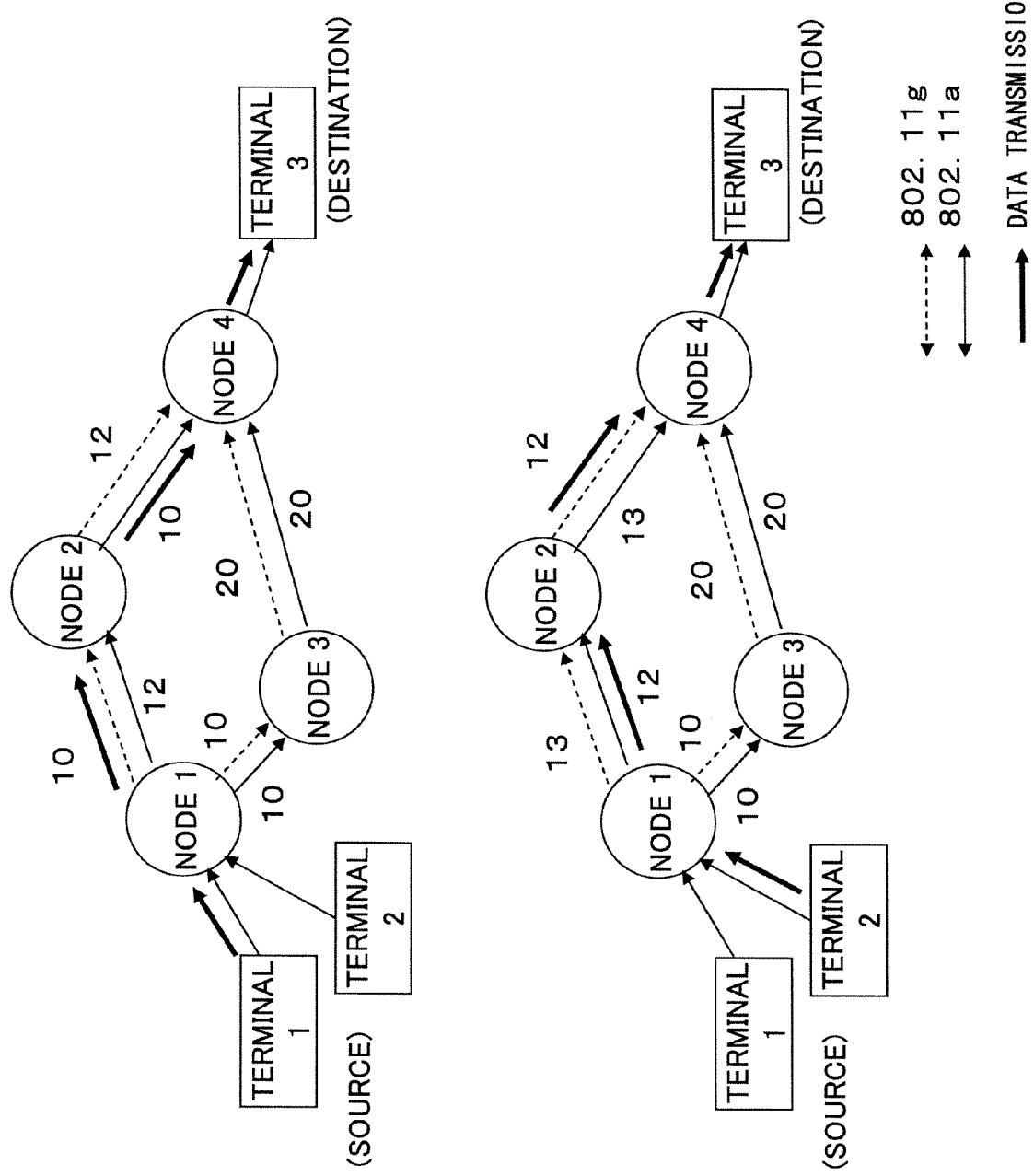
FIG. 11 is a diagram showing wireless ad hoc networks configured according to the routing control method in the fifth embodiment of the present invention.

In FIG. 11, as to transmission from the terminal 1 to the terminal 3, 802.11g is selected between the node 1 and the node 2, and 802.11a is selected between the node 2 and the node 4. By increasing communication cost of a wireless interface for which use frequency is high (by changing communication cost according to congestion degree of wireless link), a communication route using a wireless interface of low use frequency can be easily used when a request frame is sent separately. For example, if 3 is added as communication cost for a wireless interface in communication, communication cost for the wireless interface of 802.11g from the node 1 to the node 2 becomes 13. Therefore, for transmission from the terminal 2 to the terminal 3, 802.11a is selected between the node 1 and the node 2, and 802.11g is selected between the node 2 and the node 4. Accordingly, by resetting a route from the terminal 2 to the terminal 3, it becomes possible to separate a wireless interface for transmission from the terminal 1 to the terminal 3 from a wireless interface for transmission from the terminal 2 to the terminal 3.

Accordingly, in the fifth embodiment of the present invention, by managing the source address in the routing table, a wireless interface for use can be changed for each pair of the source address and the destination address, so that a route can be kept while keeping use frequency of a plurality of wireless interfaces to be constant.

That is, it becomes possible to improve effect of load distribution for the wireless interfaces. As a result, wireless resources can be effectively utilized by optimal route selection considering a plurality of wireless interfaces.

Sixth Embodiment

A case where set time that is set in the routing table is used is described as a sixth embodiment.

As shown in FIG. 4, the routing unit can write time at which setting in the routing table is performed into SET TIME of the routing table. There is a possibility that an optimal route changes in a wireless ad hoc network according to change of each node configuration or change of communication status or the like. Therefore, when a constant time elapses from the set time at which a route was set, it is desirable to resend a request frame to construct a route even though the route is already known.

In the sixth embodiment, each node is configured according to the apparatus configuration of the first embodiment for example, and the routing table in the routing unit includes set time. When receiving a data packet addressed to a corresponding destination (or a pair of source and destination) after a predetermined period time elapses from the set time described in the routing table, each node sends a request frame again.

Accordingly, in the sixth embodiment of the present invention, by periodically sending a request frame, wireless interfaces can be switched so that it becomes possible to improve effect of load distribution for each wireless interface. As a result, wireless resources can be effectively utilized by optimal route selection considering a plurality of wireless interfaces.

By the way, in the above-mentioned embodiment, during a period after a request frame is sent until communication is established, a data frame may be held in a buffer provided in the routing table separately. Alternatively, in the case when set time for the old route is new enough, the data frame can be sent in parallel with the request frame using a wireless interface of the old route by which communication route to the destination is already established.

Seventh Embodiment

In the following, a seventh embodiment is described in which, when communication cost is the same among a plurality of wireless interfaces or when difference of communication cost is small, weighting is performed for communication cost for a wireless interface used for the old route.

When a plurality of wireless interfaces exist in a wireless communication apparatus, there may frequently occur a case where communication costs are the same among nodes or a case in which difference of communication costs among the nodes is small. In such a case, if communication route is calculated by periodically sending a request frame, there is a possibility in that a different wireless interface is selected each time when communication route is calculated. It is not desirable that wireless interfaces are frequently changed from the viewpoint of system stability. Therefore, by applying hysteresis for route selection such that an old route can be easily selected, changes of wireless interfaces used in the communication route can be decreased.

Figure 13:
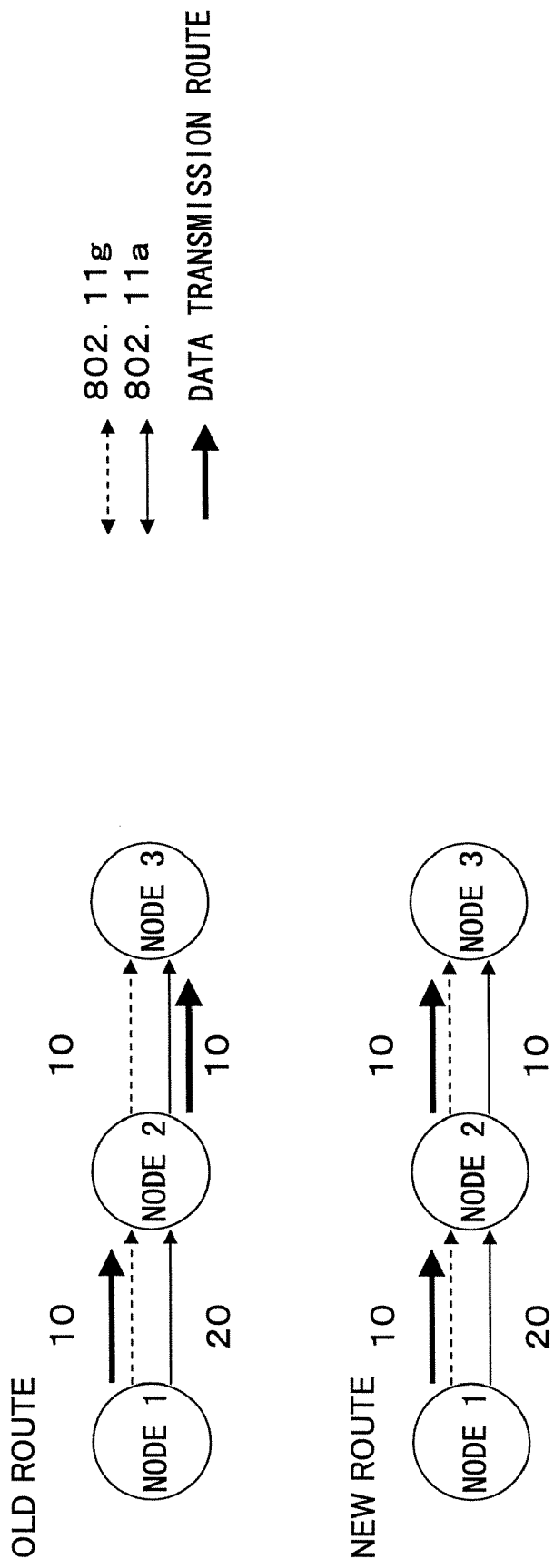
FIG. 13 is a diagram showing route selection in a case where hysteresis is not applied.

FIG. 13 is a diagram showing route selection in a case where hysteresis is not applied. Since communication costs of two wireless interfaces are largely different between the node 1 and the node 2, a wireless interface (802.11g) corresponding to smaller communication cost is always selected. On the other hand, since the communication costs are the same between the node 2 and the node 3, a wireless interface used for a communication route is selected probabilistically. Therefore, there is a case in which a wireless interface different from one of an old route may be selected in a new route, and in some instances, a different wireless interface is selected each time a communication route is calculated so that the system becomes unstable.

Therefore, in the seventh embodiment of the present invention, the routing unit shown in FIG. 3 checks whether there is a wireless interface of an old route by referring to the routing table. When there is the wireless interface used for the old route, weight equal to or less than 1 is assigned to the wireless interface used for the old route. By comparing communication costs of wireless interfaces using communication costs weighted in this way, a wireless interface used for communication is selected from among a plurality of wireless interfaces.

Figure 14:
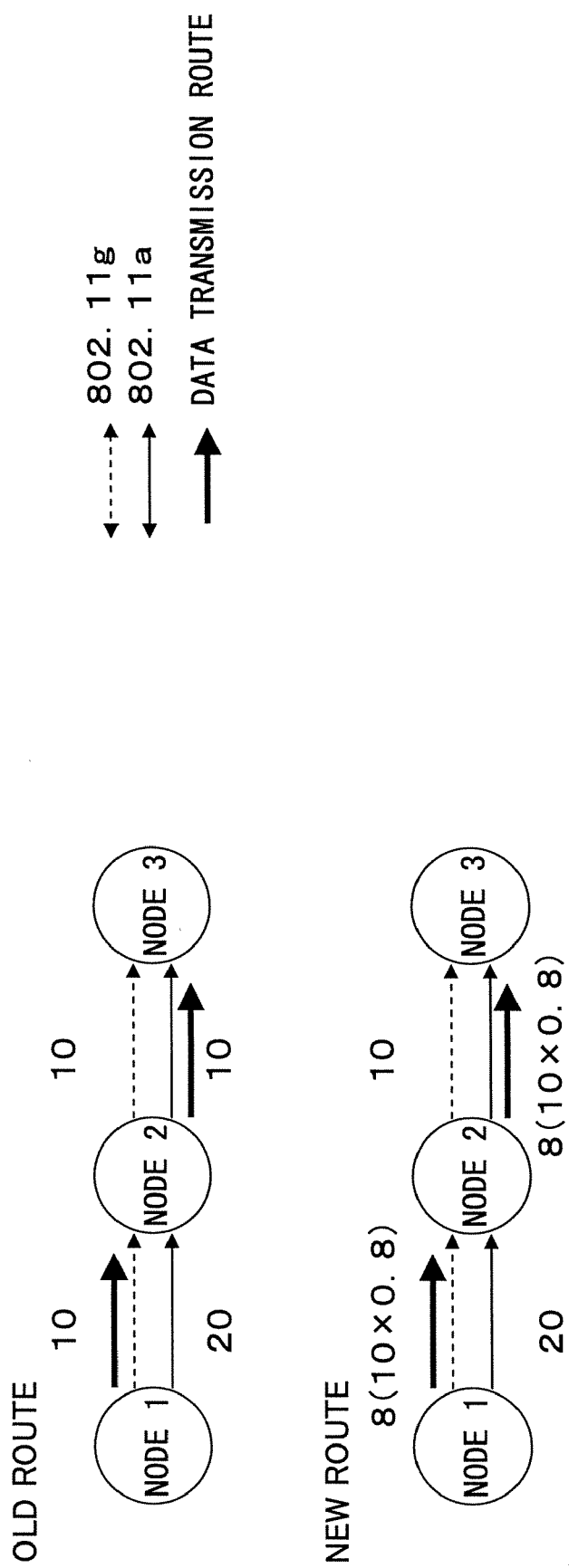
FIG. 14 is a diagram showing route selection in a case when hysteresis is applied according to a seventh embodiment of the present invention.

FIG. 14 shows route selection in a case when hysteresis is applied according to the seventh embodiment of the present invention. In the seventh embodiment, by referring to the routing table when selecting a route, communication cost of the wireless interface used in the old route is multiplied by weight equal to or less than 1. In FIG. 14, it is multiplied by 0.8 as the weight. Accordingly, a wireless interface used in the old route between the node 2 and the node 3 can be easily selected also in a new route. Especially, when communication costs of wireless interfaces between two nodes are the same or when difference between the communication costs is small, the old route is easily selected continuously so that the system becomes stable.

The smaller the value of the weight is, the higher the probability for selecting the wireless interface used for the old route becomes. Thus, by adjusting the value of the weight, load distribution using a plurality of wireless interfaces can be realized so that adjustment between stability and load distribution can be realized. As a result, optimal route selection considering a plurality of wireless interfaces becomes possible.

Frame Format Example

An example is described with reference to FIGS. 15-17 in which the request frame and the route acknowledgement frame used in the above embodiments are applied to a frame format of IEEE 802 wireless LAN.

Figure 15A:
FIG. 15A is a diagram showing a frame format when a request frame and a route acknowledgement frame is used in the IEEE 802 wireless LAN (frame format for routing control)

As a frame format for routing control indicating the request frame and the route acknowledgement frame, a frame format shown in FIG. 15A can be used in which Control ID indicating frame type is added after a header and a payload for routing control is added after it. The header and the Control ID indicate that the frame is a request frame or a route acknowledgement frame. In the payload, a destination address, a next node address, a sending interface, a communication cost value, a request ID, a set time and the like are set. By the way, a part of the payload such as a destination address may be set in the header, and may not be set in the payload.

Figure 15B:
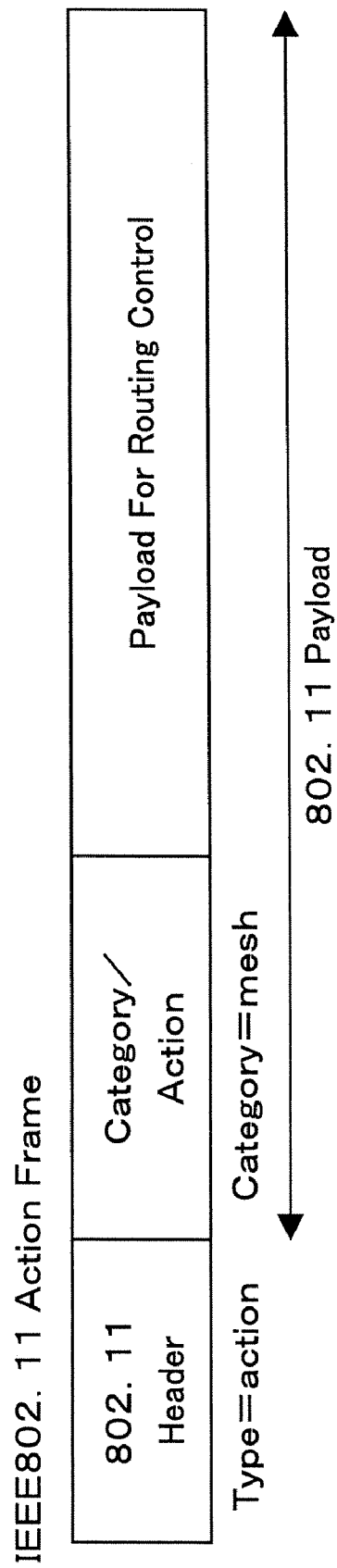
FIG. 15B is a diagram showing a frame format when a request frame and a route acknowledgement frame are used in the IEEE 802 wireless LAN (IEEE 802.11 Action Frame)
Figure 15C:
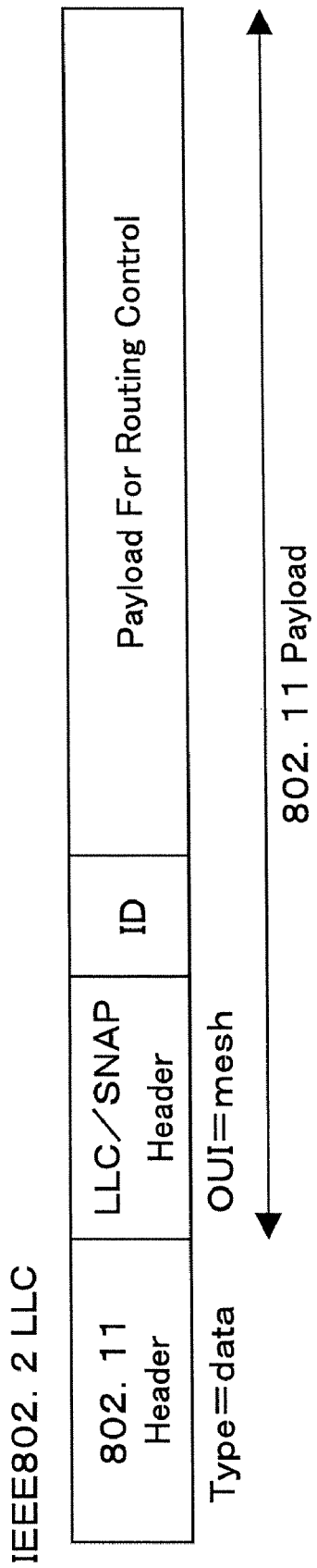
FIG. 15C is a diagram showing a frame format when a request frame and a route acknowledgement frame are used in the IEEE 802 wireless LAN (IEEE 802.2 LLC)

For using a frame format for routing control in the IEEE 802.11 wireless LAN system, a case using IEEE 802.11 Action Frame shown in FIG. 15B and a case using IEEE 802.2 LLC shown in FIG. 15C can be considered.

When using the IEEE 802.11 Action Frame, the 802.11 header corresponds to the header shown in FIG. 15A, and Category/Action corresponds to the Control ID of FIG. 15A. In the 802.11 header, Type and Subtype are set such that Type=00 (management) and Subtype=1101 (action). Accordingly, a frame can be specified to be a frame for routing control by using the 802.11 header. When setting Category and Action in the head of the next 802.11 payload, an identifier (mesh) that is an action related to mesh network is set to Category, and an identifier indicating a type of request frame/route acknowledgement frame is set to Action. By making settings in this way, a payload for routing control can be specified.

For using IEEE 802.2 LLC, the 802.11 header corresponds to the header shown in FIG. 15A, and the LLC/SNAP header and ID correspond to Control ID shown in FIG. 15A. In the 802.11 header, Type=data. In the next LLC/SNAP header, there is a field indicating organization code called OUI. An identifier (mesh) indicating mesh network is set to the OUI so as to identify a payload after that. In addition, when OUI=mesh holds true, ID is provided at the head of the next payload and an identifier indicating a type of request frame/route acknowledgement frame is set. By making settings in this way, a payload for routing control can be specified.

Since the payload for routing control can be specified by using any of the above-mentioned formats, information can be set to the payload for routing control according to a predetermined frame format and set information can be decoded. Formats shown in FIGS. 16 and 17 for example are frame format examples for the payload for routing control.

FIG. 16 is a diagram showing a frame format of the payload for routing control of the request frame. As mentioned above, the request frame includes a source address, a destination address, ID specific to the request frame and a value of communication cost from a request frame source. RREQ ID shown in FIG. 16 corresponds to the request ID, Metric corresponds to the communication cost value, Source Address corresponds to the source address, and Destination Address#1 corresponds to the destination address.

FIG. 17 is a diagram showing a frame format of a payload for routing control of a route acknowledgement frame corresponding to FIG. 16. By using the frame formats shown in FIGS. 15-17 as mentioned above, the above-mentioned embodiments can be realized using the IEEE 802.11 wireless system.

The present invention is not limited to the specifically disclosed embodiments, and variations and modifications may be made without departing from the scope of the invention.

The invention claimed is:

1. A wireless communication apparatus for performing communication via a plurality of wireless interfaces in a wireless ad hoc network, comprising:
a plurality of sending buffers that stores frames for each of the plurality of wireless interfaces;
a measurement unit that measures a total data amount of frames stored in the sending buffers for each of the plurality of wireless interfaces;
a data sending and receiving unit that, when receiving a request frame via one of the plurality of wireless interfaces, sends the request frame via at least two wireless interfaces of the plurality of wireless interfaces if a difference of the total data amount measurement values among the wireless interfaces measured by the measurement unit is equal to or less than a threshold, and, if at least one difference of differences of the total data amount measurement values among the wireless interfaces measured by the measurement unit is equal to or greater than a threshold, sends the request frame via a wireless interface in which the total data amount is smaller; and
a routing unit that selects a wireless interface to be used for communication from among the plurality of wireless interfaces based on the request frame.

2. The wireless communication apparatus as claimed in claim 1, wherein the routing unit selects the wireless interface to be used for communication from among the plurality of wireless interfaces based on arriving order of the request frame.

3. The wireless communication apparatus as claimed in claim 1, wherein the routing unit selects the wireless interface to be used for communication from among the plurality of wireless interfaces based on arriving order and communication cost of the request frame.

4. The wireless communication apparatus as claimed in claim 3, wherein the routing unit selects the wireless interface to be used for communication from among the plurality of wireless interfaces based on communication cost of a received request frame that is received within a predetermined period from arriving time of the request frame.

5. The wireless communication apparatus as claimed in claim 1, wherein the wireless communication apparatus functions as an access point for managing a terminal under the wireless communication apparatus, and
when the data sending and receiving unit receives a frame from the terminal, the data sending and receiving unit sends the request frame on behalf of the terminal.

6. The wireless communication apparatus as claimed in claim 5, wherein, when the data sending and receiving unit receives a request frame addressed to the terminal under the wireless communication apparatus, the data sending and receiving unit returns a response signal for the request frame on behalf of the terminal.

7. The wireless communication apparatus as claimed in claim 6, the wireless communication apparatus further comprising an associating terminal management unit that manages associating terminal information of terminals under the wireless communication apparatus,
wherein, when a new terminal associates with the wireless communication apparatus, the data sending and receiving apparatus broadcasts a frame reporting association of the terminal, and
when receiving a frame reporting association of a new terminal from another wireless communication apparatus, the associating terminal management unit deletes association of the terminal from the associating terminal information.

8. The wireless communication apparatus as claimed in any one of claims 1-4 and 5-7, wherein the routing unit selects the wireless interface from among the plurality of wireless interfaces for each of pairs of a source address and a destination address.

9. The wireless communication apparatus as claimed in any one of claims 1-4 and 5-7, wherein the data sending and receiving unit periodically sends the request frame based on a set time that is set in the routing unit.

10. A wireless communication apparatus for performing communication via a plurality of wireless interfaces in a wireless ad hoc network, comprising:
- a data sending and receiving unit that, when receiving a request frame via one of the plurality of wireless interfaces, sends the request frame via at least two wireless interfaces in the plurality of wireless interfaces; and
- a routing unit that selects a wireless interface to be used for communication from among the plurality of wireless interfaces based on the request frame,
- wherein the data sending and receiving unit periodically sends the request frame based on a set time that is set in the routing unit, and
- wherein, when the routing unit selects a wireless interface based on the request frame, the routing unit checks whether there is any wireless interface that is previously used for a route to a destination by referring to a routing table, and when there is such a wireless interface, the routing unit weights communication cost for the wireless interface that is previously used so as to select the wireless interface to be used for communication from among the plurality of wireless interfaces based on the weighted communication cost.

11. A communication routing control apparatus in a wireless communication apparatus for performing communication via a plurality of wireless interfaces in a wireless ad hoc network, comprising:
- means for, when detecting that a request frame is received with one of the plurality of wireless interfaces, sending the request frame via at least two wireless interfaces in the plurality of wireless interfaces;
- means for selecting a wireless interface to be used for communication from among the plurality of wireless interfaces based on the request frame,
- wherein the wireless communication apparatus includes:
  - a plurality of sending buffers for storing frames for each of the plurality of wireless interfaces;
  - a measurement unit that measures a total data amount of frames stored in the sending buffers for each of the plurality of wireless interfaces; and
  - a data sending and receiving unit that, when receiving a request frame via one of the plurality of wireless interfaces, sends the request frame via at least two wireless interfaces of the plurality of wireless interfaces if a difference of the total data amount measurement values among the wireless interfaces measured by the measurement unit is equal to or less than a threshold, and, if at least one difference of differences of the total data amount measurement values among the wireless interfaces measured by the measurement unit is equal to or greater than a threshold, sends the request frame via a wireless interface in which the total data amount is smaller.

12. A communication routing control method in a wireless ad hoc network including a plurality of wireless communication apparatuses each including a plurality of wireless interfaces, a plurality of sending buffers that store frames for each of the plurality of wireless interfaces, and a measurement unit that measures a total data amount of frames stored in the sending buffers for each of the plurality of wireless interfaces, the method comprising:
- a step in which a source node sends a request frame;
- a step in which each of the plurality of wireless communication apparatuses receives the request frame using one of the plurality of wireless interfaces;
- a step in which each of the plurality of wireless communication apparatuses selects a wireless interface to be used for communication from among the plurality of wireless interfaces based on the request frame;
- a step in which each of the plurality of wireless communication apparatuses sends the request frame from at least two wireless interfaces of the plurality of wireless interfaces if a difference of the total data amount measurement values among the wireless interfaces measured by the measurement unit is equal to or less than a threshold, and, if at least one difference of differences of the total data amount measurement values among the wireless interfaces measured by the measurement unit is equal to or greater than a threshold, sends the request frame via a wireless interface in which the total data amount is smaller;
- a step in which a destination node receives the request frame, and returns a response signal of the request frame; and
- a step in which each of the plurality of wireless communication apparatuses receives the response signal of the request frame to establish a communication route based on the response signal.

13. A communication system of a wireless ad hoc network comprising:
- a plurality of wireless communication apparatuses each including a plurality of wireless interfaces, a plurality of sending buffers that store frames for each of the plurality of wireless interfaces, and a measurement unit that measures a total data amount of frames stored in the sending buffers for each of the plurality of wireless interfaces, wherein,
- a source node sends a request frame;
- each of the plurality of wireless communication apparatuses receives the request frame using one of the plurality of wireless interfaces;
- each of the plurality of wireless communication apparatuses selects a wireless interface to be used for communication from among the plurality of wireless interfaces based on the request frame;
- each of the plurality of wireless communication apparatuses sends the request frame from at least two wireless interfaces of the plurality of wireless interfaces if a difference of the total data amount measurement values among the wireless interfaces measured by the measurement unit is equal to or less than a threshold, and, if at least one difference of differences of the total data amount measurement values among the wireless interfaces measured by the measurement unit is equal to or greater than a threshold, sends the request frame via a wireless interface in which the total data amount is smaller;
- a destination node receives the request frame, and returns a response signal of the request frame; and
- each of the plurality of wireless communication apparatuses receives the response signal of the request frame to establish a communication route based on the response signal.

* * * * *